United States Patent
Schroeder et al.

(10) Patent No.: US 6,227,125 B1
(45) Date of Patent: May 8, 2001

(54) COACH BODY OF RAILWAY VEHICLE

(75) Inventors: Karl-Josef Schroeder, Duesseldorf; Dieter Muehlhahn, Langenfeld; Matthias Koeppe, Juelich, all of (DE)

(73) Assignee: Siemens Duewag Schienenfahrzeuge GmbH, Krefeld (DE)

( * ) Notice: Subject to any disclaimer, the term of this patent is extended or adjusted under 35 U.S.C. 154(b) by 0 days.

(21) Appl. No.: 09/180,362

(22) PCT Filed: May 3, 1997

(86) PCT No.: PCT/DE97/00930

§ 371 Date: Nov. 6, 1998

§ 102(e) Date: Nov. 6, 1998

(87) PCT Pub. No.: WO97/43158

PCT Pub. Date: Nov. 20, 1997

(30) Foreign Application Priority Data

May 13, 1996 (DE) .............................. 196 19 212

(51) Int. Cl.⁷ .................................................. B61D 11/02
(52) U.S. Cl. .......................... 105/401; 105/396; 105/397; 105/404; 105/409; 105/355; 105/329; 296/197; 296/196; 296/193
(58) Field of Search ..................................... 105/396, 397, 105/401, 404, 409, 355, 329; 296/197, 196, 193; 52/578, 586.1

(56) References Cited

U.S. PATENT DOCUMENTS

| | | | |
|---|---|---|---|
| 2,496,910 | * 2/1950 | Fridolph | 105/396 |
| 3,100,458 | * 8/1963 | Baker et al. | 105/396 |
| 4,283,086 | * 8/1981 | Morin | 296/178 |
| 5,458,066 | * 10/1995 | Ishida et al. | 105/401 |
| 5,857,414 | * 1/1999 | Thoman et al. | 105/397 |

FOREIGN PATENT DOCUMENTS

| | | | |
|---|---|---|---|
| 2050275 | * 5/1979 | (GB) | B61D/17/00 |
| 2050275 | * 1/1981 | (GB) | B61D/17/00 |

* cited by examiner

Primary Examiner—S. Joseph Morano
Assistant Examiner—Frantz F. Jules
(74) Attorney, Agent, or Firm—Michael J. Striker

(57) ABSTRACT

A coach body of a rail vehicle has horizontal and vertical walls, the horizontal walls serving to form both a floor and a ceiling, while the vertical walls forming side walls, the vertical walls having cutouts for at least one window and one boarding door, the horizontal and vertical walls being formed by modules of fiber-reinforced plastic divided sectionally crosswise to a longitudinal axis of the coach body, each two of these hand-modules which are complimentary to one another and are joined in a force-transmitting way at the horizontal walls which meet in a middle of the vehicle forming one longitudinal section of the coach body, and a length of the coach body being formed accordingly by a force-transmitting connection of a number of the longitudinal sections at abutting points extending all the way around in transverse direction of the vehicle.

10 Claims, 2 Drawing Sheets

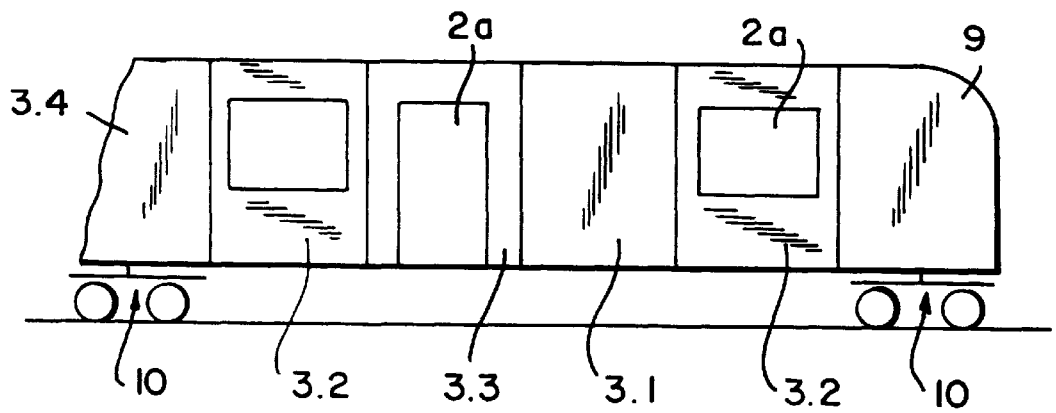
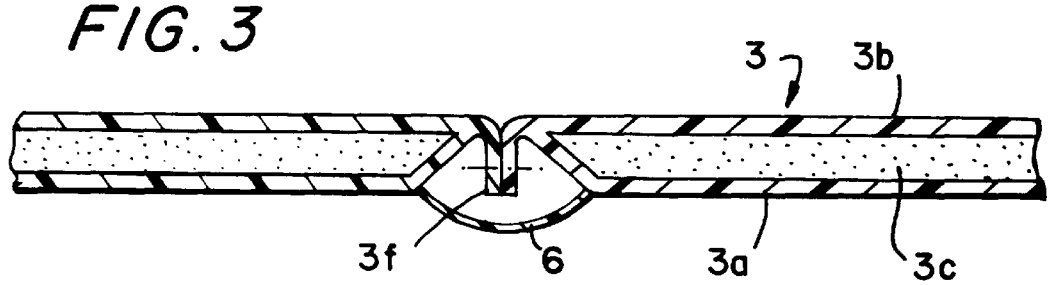
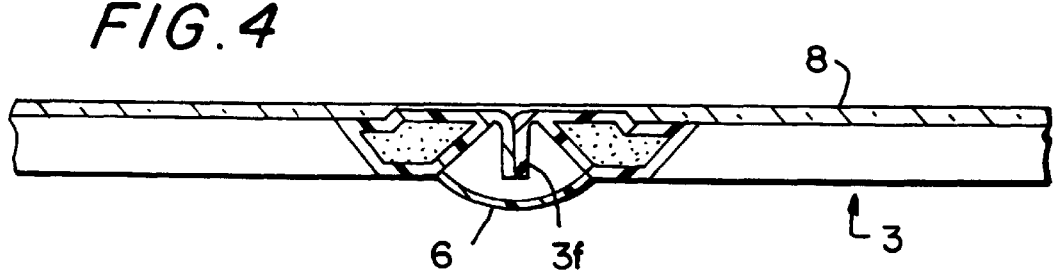
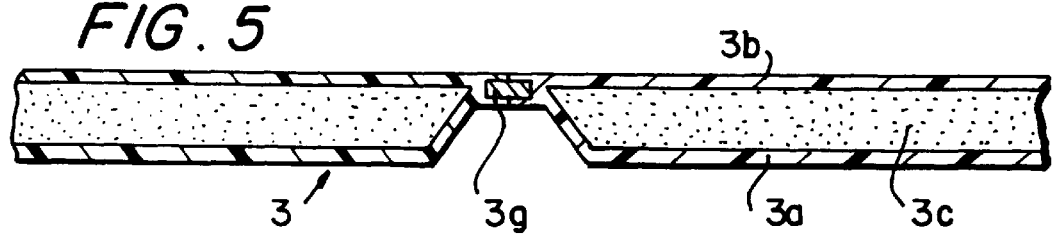

COACH BODY OF RAILWAY VEHICLE

BACKGROUND OF THE INVENTION

The invention relates to a coach body of a rail vehicle, which substantially comprises horizontal and vertical walls, wherein the horizontal walls serve to form both a floor and a ceiling and the vertical walls, in particular forming side walls, include cutouts that allow at least one window and one boarding door to be installed.

In rail vehicles, it is well known to embody the horizontal and vertical walls of the coach body by welded steel construction, using rolled, square and hollow steel sections with sheet metal welded directly onto such a skeleton. Depending on its design, such as the number and arrangement of windows and boarding doors, such a coach body is as a rule suitably for only one particular application. Any changes in this design, for instance by a different placement of the boarding doors, means a new static concept and often requires extensive structural adaptations. The aforementioned steel construction of a coach body is also complicated in terms of production and unfavorable from the standpoint of having relatively high vehicle mass.

German Patent Disclosure DE-B 1 158 541 discloses a coach body of a rail vehicle in the prior art that substantially comprises horizontal and vertical walls. The horizontal walls serve to form both a floor and a ceiling. The vertical walls, which in particular form side walls, contain cutouts that allow windows and boarding doors to be installed. The horizontal and vertical walls are formed by half-modules of fiber-reinforced plastic divided sectionally crosswise to the longitudinal axis of the vehicle; each of these modules has a structural length equivalent to the length of the coach body. As a result, very large equipment is needed for manufacturing them (see FIG. 13 of DE-B 1 158 541).

SUMMARY OF THE INVENTION

The object of the invention is to embody a coach body of this generic type with a view to the simplest possible economical production and a reduction in vehicle mass, in which the coach body should enable a high degree of flexibility in designing the rail vehicle.

According to the invention, this object is attained in that the horizontal and vertical walls are formed by half-modules of fiber-reinforced plastic divided sectionally crosswise to the longitudinal axis of the vehicle, where two of these half-modules, which are complementary to one another and are joined in a force-transmitting way at their horizontal walls that meet in the vehicle middle, form one longitudinal section of the coach body, and the length of the coach body can be designed accordingly by force-transmitting connection of a number of aforementioned longitudinal sections at their abutting points extending all the way around in the transverse direction of the vehicle.

Advantageous features of the invention are recited in the dependent claims.

The advantages attainable with the subject of the invention are in particular as follows:

The half-modules allow great flexibility in vehicle design, because any desired configuration of a coach body in its longitudinal and transverse directions can be realized. The relatively short half-modules of fiber-reinforced plastic can be produced simply and economically, and compact, easily manipulated devices can be employed for their production. Lower production costs for the coach body are also attained because there is no need to line the inside of the modules and to treat the outer surfaces for applying a flat coating over a large area. A reduction in the vehicle mass is also favorable, because energy costs for transportation can then be saved. The modules of fiber-reinforced plastic are free from corrosion and can thus be used without maintenance.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1, a rail vehicle with a coach body according to the invention in a side view;

FIG. 3, the section taken along the line A—A of FIG. 2;

FIG. 4, the section taken along the line B—B of FIG. 2;

FIG. 5, an alternative design, in section similar to that of FIG. 3.

DESCRIPTION OF PREFERRED EMBODIMENTS

Figure 2:
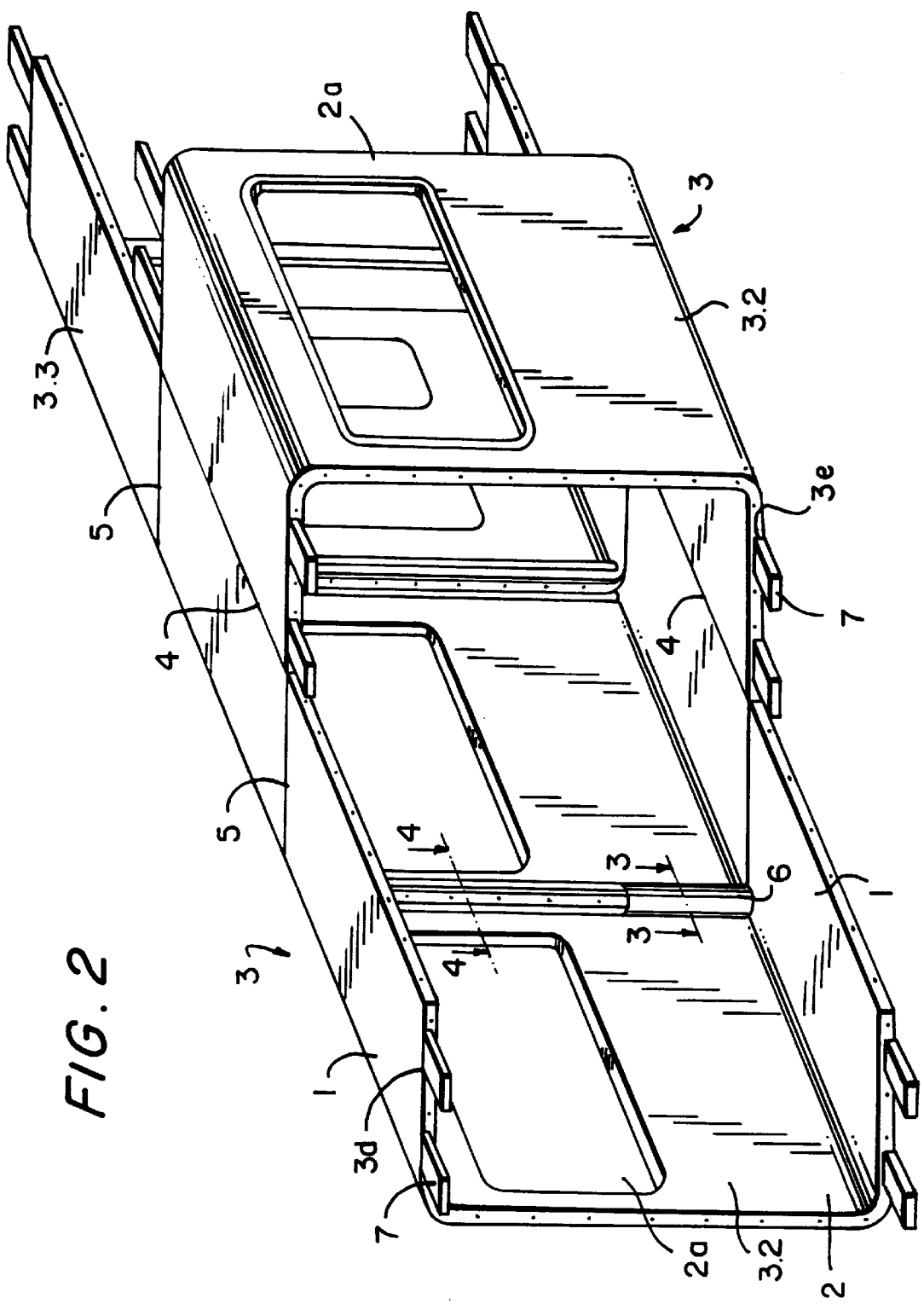
FIG. 2, a portion of the coach body according to the invention in a perspective view.

In FIGS. 1 and 2, the coach body, supported on driven or nondriven trucks 10, is put together from relatively short half-modules 3, each of them comprising fiber-reinforced plastic. Both the floor and the ceiling of the coach body are formed by horizontal walls 1, and the side walls are formed by vertical walls 2 of these modules 3. Two of these complementary half-modules 3, joined together in force-transmitting fashion at their horizontal walls 1 that meet in the transverse center 4 of the vehicle, represent one longitudinal section of the coach body. The length of the coach body is obtained by force-transmitting joining together of a suitable number of the aforementioned longitudinal sections along their abutting points 5 extending all the way around in the transverse direction of the vehicle.

The vertical walls 2 include cutouts 2a, which allow a window—for instance in the form of a pane of glass 8 inserted as in FIG. 4—or a boarding door to be installed. The cutout 2a in the vertical wall 2 for installing a boarding door may be supplemented with a recess (not shown) inside the horizontal wall 1, so as to accommodate a set of steps there. Aside from the above-described window modules 3.2 and door modules 3.3, solid-surface modules 3.1 and a module 3.4 as a transition to a joint of a train connection can selectively be used. The possibility also exists of replacing a top part 9, shown in FIG. 1, which may also be formed of fiber-reinforced plastic, with a further articulated module 3.4, or conversely to replace the articulated module 3.4 with a second top module 9. With the aid of the above-described modules 3.1–3.4, any desired configuration of a coach body in the longitudinal direction and in the transverse direction can be readily realized; for instance, one long side of the coach body may have only window modules 3.2, while the opposite long side includes two door modules 3.3 combined with window modules 3.2.

In the present exemplary embodiment, the modules 3 have rectangular voids 3d in the region of the horizontal walls 1 of the ceiling. In the region of the horizontal walls 1 of the floor, the modules 3 are provided with corresponding grooves 3e. The voids 3d and the grooves 3e each receive one belt 7 extending continuously the length of the coach body, and this belt can be acted upon by both tensile and compressive forces and by bending forces. The belt 7 may be a metal profile section or preferably may comprise fiber-reinforced plastic with longitudinally oriented endless fibers and can be produced for instance by pultrusion. In terms of the static makeup of the coach body, there is a separation between tensile and compressive loads, on the one hand, which are transmitted with the aid of the continuous belts 7, and thrust loads on the other, whose transmission is effected through the modules 3.

As FIGS. 3–5 show, the modules 3 are formed of an inner layer 3a of fiber-reinforced plastic, an outer layer 3b of the same material, and a core layer 3c, disposed between these layers, with good properties in terms of thermal and acoustic insulation. Various lightweight construction materials are suitable for the core layer 3c, such as balsa wood, foam materials, and honeycomb materials. The fiber-reinforced plastic has glass, carbon, aramide, and/or natural fibers. As the reinforcing material, glass, carbon, aramide and/or other reinforcing fibers can be used; the selection of the fiber material can depend on the applicable local load on the modules 3. It is understood that the fiber-reinforced plastic will meet the relevant fireproofing regulations. For the production of the modules 3, injection molding is recommended, because with it finished surfaces that are smooth on the inside and outside can be attained. Thus the usual lining of the inside and painting flat coatings over large areas of the outer surfaces before final painting as in metal coach bodies, are accordingly unnecessary.

Each half-module, in its region to be joined in force-transmitting fashion to other modules, is embodied to suit the joining technique that employs screws, rivets and/or adhesive bonding. To that end, as shown in FIGS. 3–5, the inner layer 3a and the outer layer 3b are put together; as shown in FIGS. 3 and 4, this forms an angle section 3f that can be used for the joining using screws, rivets and adhesive bonding. In FIG. 5, the joining is done solely by adhesive bonding, using a reinforcing strip 3g.

The abutting point 5 of two longitudinal sections, which extends all the way around crosswise of the vehicle, can be lined by a strip 6, shown in FIGS. 2–4, only a portion of which is shown in FIG. 2. The abutting point 5 extending all the way around crosswise of the vehicle can at the same time, because of its stability, be utilized for securing accessory parts of the vehicle, such as a partition, passenger seat or support pole. The void, covered by the strip 6, in the region of the abutting point 5 is suitable for receiving supply lines, such as cables and pipes. The half-modules 3 may also have ducts, not shown, for such supply lines.

What is claimed is:

1. A coach body of a rail vehicle, comprising horizontal and vertical walls, said horizontal walls serving to form both a floor and a ceiling, while said vertical walls forming side walls, said vertical walls having cutouts for at least one window and one boarding door, said horizontal and vertical walls being formed by half-modules of fiber-reinforced plastic divided sectionally crosswise to a longitudinal axis of the coach body, each two of these half-modules which are complimentary to one another and are joined in a force-transmitting way at said horizontal walls which meet in a middle of the vehicle forming one longitudinal section of the coach body, and a length of the coach body being formed accordingly by a force-transmitting connection of a number of said longitudinal sections at abutting points extending all the way around in transverse direction of the vehicle, said longitudinal sections including two adjacent longitudinal sections which extend all the way around in a transverse direction of the coach body and have an abutting point formed for securing accessory parts of the vehicle selected from the group consisting of a partition, a passenger seat, and a support pole.

2. A coach body as defined in claim 1, wherein said half-modules have four types, including one solid-surface module, one module with a window cutout, one module with a door cutout, and one module as a transition to a joint of a train combination.

3. A coach body as defined in claim 1, wherein said half-modules include an inner layer, an outer layer and a core layer located between said inner and outer layers for thermal and acoustic insulation, said inner layer and said outer layer being composed of fiber-reinforced plastic.

4. A coach body as defined in claim 3, wherein said fiber-reinforced plastic has fibers selected from the group consisting of glass fibers, carbon fibers, aramide fibers, and natural fibers.

5. A coach body as defined in claim 3, wherein said fiber-reinforced plastic has a matrix material selected from the group consisting of epoxy resins, unsaturated polyester resins, vinyl ester resins, and vinyl resins.

6. A coach body as defined in claim 1, wherein said half-modules are formed as injection molded elements.

7. A coach body as defined in claim 1, wherein each of said half-modules in its region to be joined in force-transmitting fashion to other modules is formed so as to allow a joining technique with the use of joining elements selected from the group consisting of screws, rivets, and adhesives.

8. A coach body as defined in claim 1, wherein, said longitudinal sections including two adjacent longitudinal sections which extend all the way around in a transverse direction of the coach body and have an abutting point lined with a strip.

9. A coach body of a rail vehicle, comprising horizontal and vertical walls, said horizontal walls serving to form both a floor and a ceiling, while said vertical walls forming side walls, said vertical walls having cutouts for at least one window and one boarding door, said horizontal and vertical walls being formed by half-modules of fiber-reinforced plastic divided sectionally crosswise to a longitudinal axis of the coach body, each two of these half-modules which are complimentary to one another and are joined in a force-transmitting way at said horizontal walls which meet in a middle of the vehicle forming one longitudinal section of the coach body, and a length of the coach body being formed accordingly by a force-transmitting connection of a number of said longitudinal sections at abutting points extending all the way around in transverse direction of the vehicle, said half-modules in a region of said horizontal walls on said ceiling and/or on said floor having rectangular formations selected from the group consisting of voids and grooves, and each receiving a belt which extends continuously over a length of the coach body, said belt being stressable by tensile, compressive and bending forces.

10. A coach body as defined in claim 9, wherein said belt has fiber-reinforced plastic with longitudinally oriented endless fibers.

* * * * *